(12) United States Patent
Duplaix et al.

(10) Patent No.: US 9,697,597 B2
(45) Date of Patent: Jul. 4, 2017

(54) METHOD OF CORRECTING A THREE-DIMENSIONAL IMAGE OF AN ELECTRONIC CIRCUIT

(71) Applicant: VIT, Saint Egreve (FR)

(72) Inventors: François Duplaix, Saint Egreve (FR); Mathieu Perriollat, Saint Egreve (FR); Romain Roux, Saint Egreve (FR)

(73) Assignee: VIT, Saint Egreve (FR)

( * ) Notice: Subject to any disclaimer, the term of this patent is extended or adjusted under 35 U.S.C. 154(b) by 0 days.

(21) Appl. No.: 14/783,504

(22) PCT Filed: Apr. 9, 2014

(86) PCT No.: PCT/FR2014/050854
§ 371 (c)(1),
(2) Date: Oct. 9, 2015

(87) PCT Pub. No.: WO2014/167249
PCT Pub. Date: Oct. 16, 2014

(65) Prior Publication Data
US 2016/0267636 A1   Sep. 15, 2016

(30) Foreign Application Priority Data

Apr. 11, 2013   (FR) .................................... 13 53276

(51) Int. Cl.
*G06K 9/00*   (2006.01)
*G06T 7/00*   (2017.01)
*G06T 7/60*   (2017.01)

(52) U.S. Cl.
CPC ................ *G06T 7/001* (2013.01); *G06T 7/60* (2013.01); *G06T 2200/04* (2013.01); *G06T 2207/30141* (2013.01)

(58) Field of Classification Search
CPC ....... G06T 7/001; G06T 7/60; G06T 2200/04; G06T 2207/30141
USPC ........ 382/149, 146, 219, 151, 153; 356/376, 356/394, 237.1
See application file for complete search history.

(56) References Cited

U.S. PATENT DOCUMENTS 6,055,054 A *   4/2000   Beaty ..................... G01N 21/88
                                                      348/126
6,496,270 B1 *  12/2002   Kelley .............. G01B 11/0608
                                                      356/237.5

(Continued)

OTHER PUBLICATIONS

A N D R É Algotsson,"Solder Paste Inspection from Sparse 3D Measurements", Master of Science Thesis, published 2012, pp. 56 56.*

(Continued)

*Primary Examiner* — Mekonen Bekele
(74) *Attorney, Agent, or Firm* — Moreno IP Law LLC

(57) ABSTRACT

Correction of an initial three-dimensional image of a deformed object comprises the provision of a model of the undeformed object comprising first zones, the determination in the initial three-dimensional image of second zones corresponding to the first zones, the determination of a first geometric transformation which maps the second zones to the first zones and the determination of a three-dimensional image corrected on the basis of the first geometric transformation and of the initial three-dimensional image.

13 Claims, 3 Drawing Sheets

(56) References Cited

U.S. PATENT DOCUMENTS

| | | | | |
|---|---|---|---|---|
| 6,877,864 | B1* | 4/2005 | Tamura | G09G 3/002 348/E5.137 |
| 7,085,400 | B1* | 8/2006 | Holsing | A61B 90/36 382/103 |
| 7,813,559 | B2* | 10/2010 | Duquette | G06K 9/00 382/151 |
| 8,363,924 | B2* | 1/2013 | Ikeda | G01R 31/2891 324/537 |
| 8,494,237 | B2* | 7/2013 | Luisi | G06K 9/6255 382/128 |
| 8,768,514 | B2* | 7/2014 | Hoshikawa | H04N 5/23248 29/721 |
| 9,456,536 | B2* | 9/2016 | Hung | H05K 13/0015 |
| 2005/0219829 | A1* | 10/2005 | Lee | H05K 1/119 361/761 |
| 2009/0022381 | A1* | 1/2009 | Gorges | A61B 6/4441 382/131 |
| 2012/0121161 | A1* | 5/2012 | Eade | G09B 29/007 382/153 |
| 2012/0128231 | A1 | 5/2012 | Hwang | |

OTHER PUBLICATIONS

"Correction Method for Geometric Image Distortion with Application to Printed Circuit Board Inspection Systems"; Wan- young Lee and Tae-Hyoung Park; ICCAS-SICE International Joint Conference 2009; 6 pages.

"A Concise and Rapid Error Correction Algorithm in Automatic Optical Inspection of Solder Paste"; Jianjie Wu and Zhongbing Chen; 2011 International Conference on Internet Computing and Information Services; School of Software Engineering; IEEE Computer Society; 5 pgs.

"Solder Paste Inspection from Sparse 3D Measurements"; André Algotsson; Master of Science Thesis, Stockholm, Sweden 2012; 56 pgs.

International Search Report filed in PCT/FR2014/050854; dated Jul. 11, 2014; 3 pages.

English Translation of the Written Opinion of the International Searching Authority filed in PCT/FR2014/050854; 7 pages.

* cited by examiner

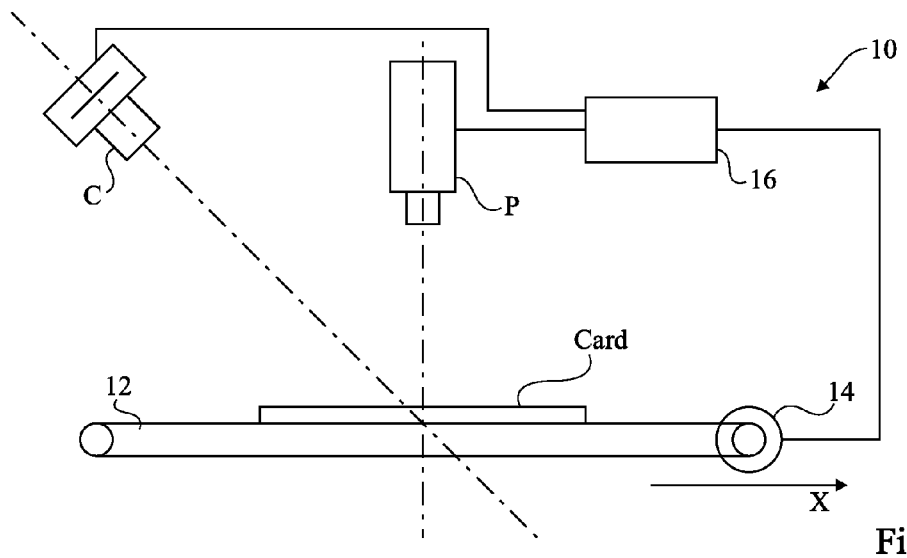
Fig 1
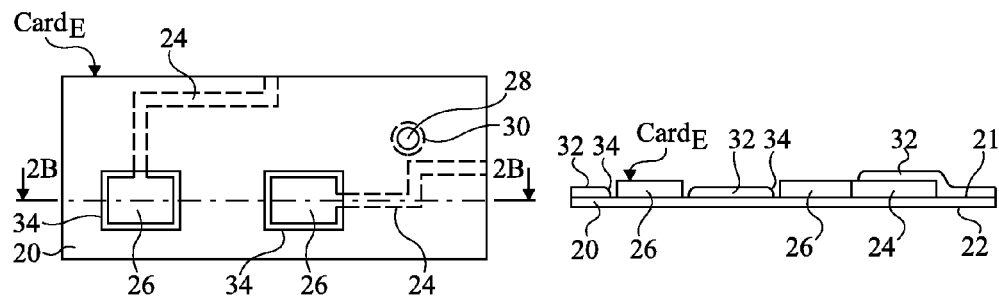
Fig 2A    Fig 2B
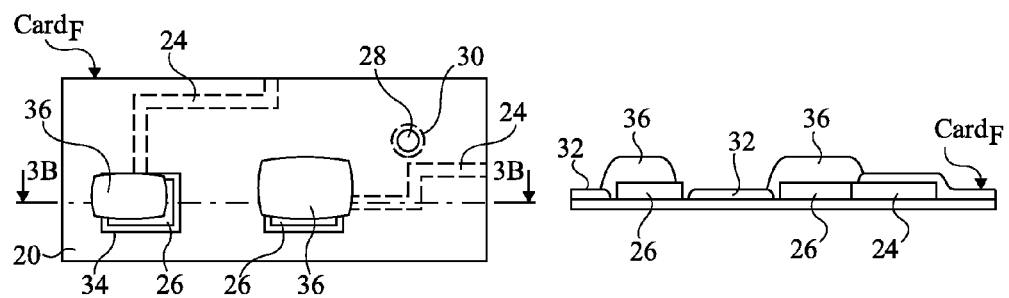
Fig 3A    Fig 3B
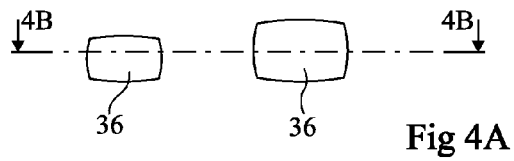 
Fig 4A    Fig 4B

METHOD OF CORRECTING A THREE-DIMENSIONAL IMAGE OF AN ELECTRONIC CIRCUIT

The present patent application claims the priority benefit of French patent application FR13/53276 which is herein incorporated by reference.

BACKGROUND

The present disclosure generally relates to optical inspection systems and, more specifically, to three-dimensional image determination systems intended for the on-line analysis of objects, particularly of electronic circuits. The present invention more specifically relates to systems fitted with digital cameras.

DISCUSSION OF THE RELATED ART

Optical inspection systems are generally used to check the good state of an object before it is released to the market. They especially enable to determine a three-dimensional image of the object which may be analyzed to search for possible defects. In the case of an electronic circuit comprising, for example, a printed circuit fitted with electronic components, the three-dimensional image of the electronic circuit may be used, in particular, to inspect the sound condition of the weldings of the electronic components on the printed circuit.

To achieve this, a three-dimensional image of the printed circuit on which welding paste has been deposited is compared with a three-dimensional image of the printed circuit in the absence of welding paste, for example, to obtain a three-dimensional image representative of the differences between the three-dimensional images of the printed circuit with and without welding paste. The analysis of this three-dimensional comparison image especially enables to determine whether the weldings of the electronic components are satisfactory.

However, printed circuits may comprise deformations which make the comparison of three-dimensional images in-accurate. Patent application US2012/0128231 describes a method enabling to correct such deformations. However, this method does not enable to correct all the deformations of a three-dimensional image of a deformed object.

SUMMARY

Thus, an embodiment provides a method of correcting an initial three-dimensional image of a deformed object comprising providing a model of the non-deformed object comprising first areas, determining in the initial three-dimensional image second areas corresponding to the first areas, determining a first geometric transformation which matches the second areas with the first areas, and determining a corrected three-dimensional image corrected based on the first geometric transformation and on the initial three-dimensional image.

According to an embodiment, the method comprises the steps of:
providing the model of the non-deformed object comprising third areas;
acquiring at least one two-dimensional image of the object with an image sensor;
searching in the two-dimensional image for at least fourth areas corresponding to the third areas;
determining a second geometric transformation which matches the fourth areas with the third areas;
applying the second transformation to the first areas to obtain fifth areas in the two-dimensional image;
searching in the initial three-dimensional image for the second areas corresponding to the fifth areas;
determining a third geometric transformation which matches the second areas with the fifth areas;
determining the corrected three-dimensional image based on the second and third geometric transformations and on the initial three-dimensional image.

According to an embodiment, the object comprises a printed circuit comprising at least one support, conductive tracks on the support, and a resin layer at least partly covering the conductive tracks.

According to an embodiment, at least one of the first areas comprises a planar portion of the resin layer.

According to an embodiment, at least one of the first areas comprises the edge of a conductive track.

According to an embodiment, at least one of the third areas comprises a pattern of an opening crossing the printed circuit.

According to an embodiment, at least one of the third areas comprises a pattern of a conductive track changing direction.

According to an embodiment, the method comprises a step of delivering an initial model which does not comprise the first and third areas and a step of modifying the initial model to add thereto a description of the first and third areas.

According to an embodiment, the method comprises the steps of, in a training phase:
acquiring a three-dimensional image of a training object;
correcting the deformations of the three-dimensional of the training object;
determining first and third areas on the corrected three-dimensional image of the training object; and
modifying the initial model to add thereto a description of the determined first and third areas.

According to an embodiment, the model comprises a digital description file representative of a two-dimensional image.

According to an embodiment, the method further comprises determining a fourth geometric transformation which matches the points of the three-dimensional image of the training object with the pixels of the initial model.

According to an embodiment, the method comprises the steps of:
determining a first three-dimensional image of an empty printed circuit;
determining the first geometric transformation associated with the first three-dimensional image;
correcting the first three-dimensional image based on the first geometric transformation associated with the first three-dimensional image;
determining a second three-dimensional image of a printed circuit covered with welding paste blocks;
determining the first geometric transformation associated with the second three-dimensional image;
correcting the second three-dimensional image based on the first geometric transformation associated with the second three-dimensional image; and
comparing the first and second corrected three-dimensional images.

According to an embodiment, the method comprises a step of selecting first areas from among said first areas for the determination of the first geometric transformation associated with the second three-dimensional image.

According to an embodiment, the method comprises a step of selecting third areas from among said third areas for the determination of the first geometric transformation associated with the second three-dimensional image.

BRIEF DESCRIPTION OF THE DRAWINGS

The foregoing and other features and advantages will be discussed in detail in the following non-limiting description of specific embodiments in connection with the accompanying drawings, among which:

FIG. 1 partially and schematically shows an embodiment of an electronic circuit optical inspection system;

FIGS. 2A, 3A, and 4A are partial simplified top views of an electronic circuit particularly showing elements constitutive of an electronic card and illustrating successive steps of an embodiment of a method of inspecting the electronic circuit;

FIGS. 2B, 3B, and 4B are partial simplified cross-section views of the electronic circuits respectively shown in FIGS. 2A, 3A, and 4A;

DETAILED DESCRIPTION

Figure 5A:
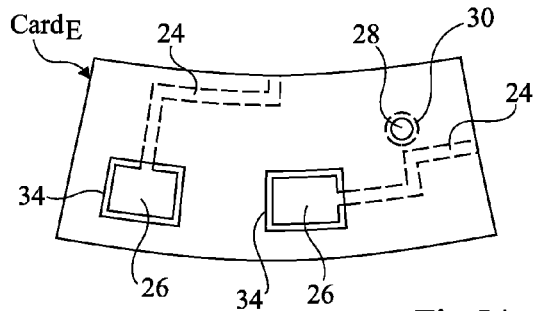
FIGS. 5A and 5B are views similar to FIGS. 2A and 2B in the case of a deformed electronic circuit.

For clarity, the same elements have been designated with the same reference numerals in the various drawings and, further, the various drawings are not to scale. In the following description, unless otherwise indicated, terms "substantially", "approximately", and "in the order of" mean "to within 10%". Further, only those elements which are useful to the under-standing of the present description have been shown and will be described.

FIG. 1 very schematically shows an electronic circuit inspection system 10. Term electronic circuits indifferently designates an assembly of electronic components interconnected via a support, the support alone used to form this interconnection without the electronic components, or the support without the electronic components but provided with means for attaching the electronic components. As an example, the support is a printed circuit and the electronic components are attached to the printed circuit by welding joints obtained by heating welding paste blocks. In this case, electronic circuit indifferently designates the printed circuit alone (with no electronic components or welding paste blocks), the printed circuit provided with the welding paste blocks and without electronic components, the printed circuit provided with the welding paste blocks and electronic components before the heating operation, or the printed circuit provided with the electronic components attached to the printed circuit by the welding joints.

System 10 enables to determine a three-dimensional image of electronic circuit Card. Each electronic circuit Card is placed on a conveyor 12, for example, a planar conveyor. Conveyor 12 is capable of displacing circuit Card along a direction X, for example, a horizontal direction. As an example, conveyor 12 may comprise an assembly of straps and of rollers driven by a rotating electric motor 14. As a variation, conveyor 12 may comprise a linear motor displacing a carriage supporting electronic circuit Card. Circuit Card for example corresponds to a rectangular card having a length and a width varying from 50 mm to 550 mm.

System 10 comprises an image projection device P comprising at least one projector, a single projector P being shown in FIG. 1. Projector P is connected to an image processing computer system 16. When a plurality of projectors P are present, projectors P may be substantially aligned along a direction perpendicular to direction X. System 16 may comprise a computer or a microcontroller comprising a processor and a non-volatile memory having instruction sequences stored therein, their execution by the processor enabling system 16 to carry out the desired functions. As a variation, system 16 may correspond to a dedicated electronic circuit. Electric motor 14 is further controlled by system 16.

System 10 further comprises an image acquisition device C comprising at least one digital camera, a single camera C being shown in FIG. 1. Camera C is connected to image processing computer system 16. When a plurality of cameras C are present, cameras C may be substantially aligned, for example, by groups of cameras, preferably along a direction perpendicular to direction X, and/or may be arranged on either side of projector(s) P.

The means for controlling conveyor 12, camera C, and projector P of previously-described optical acquisition system 10 are within the abilities of those skilled in the art and are not described in further detail. As a variation, the displacement direction of circuit Card may be a horizontal direction perpendicular to direction X shown in FIG. 1.

System 10 is capable of determining a three-dimensional image of circuit Card by projection of images, for example, fringes, on the circuit to be inspected. In the present embodiment, camera C and projector P are fixed and electronic circuit Card is displaced with respect to camera C and to projector P via conveyor 12. As a variation, electronic circuit Card is fixed and camera C and projector P are displaced with respect to electronic circuit Card by any adapted conveying device.

FIG. 2A is a partial simplified top view of a printed circuit $Card_E$ which comprises no electronic components and no welding paste blocks. Such a circuit $Card_E$ is called empty card hereafter. FIG. 2B is a cross-section view of printed circuit $Card_E$ of FIG. 2A along line 2B-2B.

Empty card $Card_E$ may correspond to a multilayer printed circuit comprising a stack of insulating layers having conductive tracks provided therebetween, or to a single-layer printed circuit comprising an insulating support having conductive tracks provided on a surface or on both surfaces thereof. In the following description, a monolayer printed circuit $Card_E$ is described, even though it should be clear that circuit $Card_E$ may be a multilayer printed circuit.

Empty card $Card_E$ comprises an insulating support 20 having opposite upper and lower surfaces 21, 22. Conductive tracks 24 and lands 26 are arranged on surface 21. Conductive tracks 24 may correspond to strips of a conductive material, particularly copper, having for example a width from 0.5 to 10 mm, preferably from 0.5 to 3 mm. Empty card $Card_E$ may further comprise, on surface 21, portions, not shown, of plates of a conductive material, for example, copper, surrounding conductive tracks 24, particularly to form a ground plane. Lands 26 are conductive areas of said conductive material, each intended to receive a welding paste block for the connection of electronic components. Lands 26 for example have a rectangular cross-section or a circular cross-section. As an example, each land 26 has, in top view, the shape of a rectangle with a length varying from some hundred micrometers to some ten millimeters and a width varying from some hundred micrometers to some ten millimeters. Circuit $Card_E$ may further comprise openings 28 which cross the entire support 20 and have their sides covered with a conductive material 30, for example, copper. Printed circuit $Card_E$ comprises a resin layer 32 which covers support 20, conductive tracks 24, and the ground plane, if present, but which does not cover lands 26. Indeed, openings 34 are provided in resin layer 32 to expose lands 26. The edges of conductive tracks 24 covered with resin layer 32 are shown by dotted lines on the different top views.

FIG. 3A is a partial simplified top view of a printed circuit $Card_F$ which has the same structure as empty card $Card_E$ of FIG. 2A and which further comprises welding paste blocks 36 and possibly electronic components. Circuit $Card_F$ is called full card hereafter. FIG. 3B is a cross-section view of printed circuit $Card_F$ of FIG. 3A along line 3B-3B. FIGS. 3A and 3B show two welding paste blocks 36. As an example, welding paste blocks 36 are laid by serigraphy or by a point-by-point laying method. A method of forming welding paste blocks by silk screening comprises covering empty card $Card_E$ with a silk screening mask comprising openings at the locations of lands 26 and spreading welding paste on the mask to form the welding paste blocks through the mask openings.

Inspection system 10 is used to determine a three-dimensional image $I3D_E$ of empty card $Card_E$ and a three-dimensional image $I3D_F$ of full card $Card_F$. A three-dimensional image of an electronic circuit corresponds to a cloud of points, for example, of several million points, of at least a portion of the external surface of the circuit, where each point of the surface is located by its coordinates (x, y, z) determined with respect to a three-dimensional space reference system R (Ox, Oy, Oz). As an example, plane (Ox, Oy) corresponds to a reference plane of inspection system 10, generally parallel to the plane containing upper surface 21 or lower surface 22 of the printed circuit. Direction (Oz) is perpendicular to plane (Ox, Oy), that is, perpendicular to surfaces 21 and 22. In the following description, two-dimensional image, or 2D image, designates a digital image acquired by one of cameras C and corresponding to a pixel array. In the following description, unless otherwise indicated, term image refers to a two-dimensional image.

Processing system 16 determines a new three-dimensional image $I3D_S$ by comparison of three-dimensional image $I3D_F$ of full card $Card_F$ and of three-dimensional image $I3D_E$ of empty card $Card_E$. Three-dimensional image $I3D_S$ only comprises the elements which are not common to three-dimensional images $Card_F$ and $Card_E$. The obtained image $I3D_S$ thus corresponds to a three-dimensional image of the surface of welding paste blocks 36 alone, and possibly of the electronic components if they are present on full card $Card_F$.

FIG. 4A is a top view of image $I3D_S$ obtained from full card $Card_F$ shown in FIGS. 3A and 3B and from empty card $Card_E$ shown in FIGS. 2A and 2B. FIG. 4B is a cross-section view of FIG. 4A along line 4B-4B.

Based on an analysis of three-dimensional image $I3D_S$, processing system 16 determines different geometric parameters associated with each welding paste block 36. Examples of parameters are the welding paste block, the average height of the welding paste block, the contour in top view of the welding paste block, the offset of the welding paste block with respect to underlying land 26, a form factor of the welding paste block, for example the ratio of the width to the length of the welding paste block. These parameters may be compared with expected thresholds to determine whether welding paste blocks 36 are adapted to obtain a satisfactory mechanical and electrical connection between the electronic components and the printed circuit.

The previously-described optical inspection method assumes that images $I3D_F$ and $I3D_E$ can be properly compared. This assumes that the printed circuit of full card $Card_F$ and the printed circuit of empty card $Card_E$ have exactly the same shape.

Figure 5B:
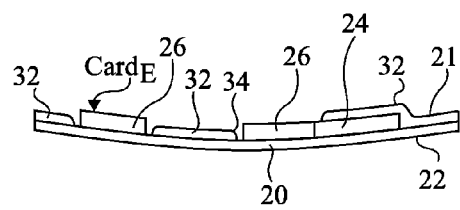
Figure 6A:
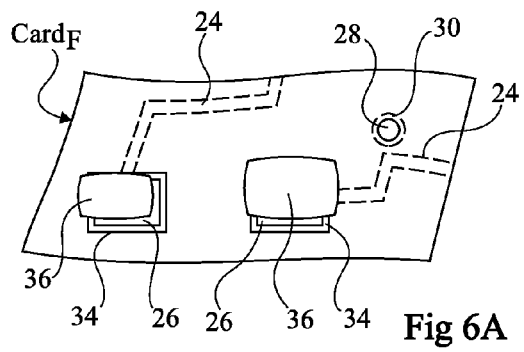
FIGS. 6A and 6B are views similar to FIGS. 3A and 3B in the case of a deformed electronic circuit.
Figure 6B:
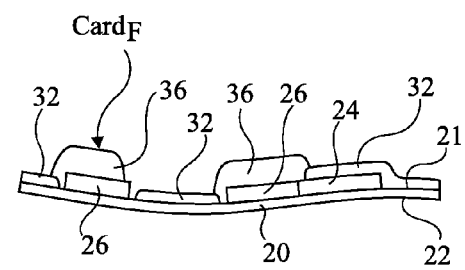

FIGS. 5A and 5B are views respectively similar to FIGS. 2A and 2B in the case where empty card $Card_E$ comprises deformations and FIGS. 6A and 6B are views respectively similar to FIGS. 3A and 3B in the case where full card $Card_F$ comprises deformations.

Two types of deformations can be generally distinguished: deformations which appears in the top view of the printed circuit (FIGS. 5A and 6A), called 2D deformations hereafter, and deformations which appear in transverse cross-section views of the printed circuit (FIGS. 5B and 6B), called 3D deformations hereafter. The 2D and 3D deformations reflect the warping of the printed circuit.

Such deformations may originate from the printed circuit manufacturing method. As an example, the manufacturing method may comprise heating steps which may cause deformations in the printed circuit due to different thermal expansion coefficients of the materials forming the printed circuit. The manufacturing method may further comprise assembly steps, particularly steps of assembling components on the printed circuit, which may cause deformations. The deformations are generally not identical from one printed circuit to the other, even for printed circuits corresponding to a same circuit pattern and manufactured according to a same manufacturing method.

Three-dimensional image $I3D_E$ of empty card $Card_E$ is determined with a reference printed circuit. Reference printed circuit designates a specific printed circuit having realistic deformations characteristic of the product. The determination of three-dimensional image $I3D_E$ may correspond to the determination of a single three-dimensional image with a single reference printed circuit. As a variation, a plurality of three-dimensional images of the same reference printed circuit may be determined and three-dimensional image $I3D_E$ corresponds to the average of the determined three-dimensional images. According to another variation, a plurality of three-dimensional images of a plurality of reference printed circuits may be determined. The three-dimensional images are then corrected as described in further detail hereafter and three-dimensional image $I3D_E$ corresponds to the average of the corrected three-dimensional images.

For obvious reasons of compatibility with a processing at an industrial rate, three-dimensional images $I3D_F$ of full cards $Card_F$ to be inspected are each compared with the same three-dimensional image $I3D_E$. The deformations of printed circuit $Card_E$ and of printed circuit $Card_F$ may be different as appears in FIGS. 5A, 5B, 6A, and 6B.

Such deformations may make it difficult, or even impossible, to compare three-dimensional images $I3D_E$ and $I3D_F$. Without taking into account such deformations, image $I3D_S$ of the external surfaces of the welding paste blocks, and possibly of the electronic components, may be inaccurate. The geometric parameters of the welding paste blocks may then not be accurately determined, or even not be determined at all.

Conventionally, marks are placed on the printed circuit to be recognized by processing system 16 on the images acquired by camera C. These are for example marks having a shape or a color which ease their identification on the images acquired by camera C. Processing system 16 can then apply geometric transformations, particularly a translation or a rotation, to the three-dimensional images so that the marks of each three-dimensional image are generally superposed.

Further, the comparison of images $I3D_E$ and $I3D_F$ may be performed locally, portions by portions. Processing system 16 can then apply geometric transformations, particularly a translation or a rotation, to have the portions of images $I3D_E$ and $I3D_F$ which are compared coincide as much as possible. However, such a correction enables to only partially correct the 2D and 3D deformations. The comparison of images $I3D_E$ and $I3D_F$ may thus remain inaccurate. Further, the duration of such a method which comprises comparing and correcting three-dimensional images portions by portions may be incompatible with a use at an industrial scale.

Patent application US2012/0128231 describes an optical inspection method enabling to correct deformations. However, such a method does not enable to correct 3D deformations.

Thus, an object of an embodiment is to overcome all or part of the disadvantages of previously-described optical inspection methods.

Another object of an embodiment is to correct the deformations of three-dimensional images of objects, particularly of electronic circuits.

Another object of an embodiment is to increase the accuracy of three-dimensional images obtained by comparison of three-dimensional images of objects, particularly of electronic circuits.

Another object of an embodiment is to decrease the duration of determination of accurate three-dimensional images obtained by comparison of three-dimensional images of objects, particularly of electronic circuits.

Another object of an embodiment is for the correction method to be compatible with a use at an industrial scale.

Methods of computer design and/or manufacturing of electronic circuits generally implement one or a plurality of computer models. In particular, computer aided design or CAD software generally provides digital files describing the different printed circuit elements (particularly, the insulating support, the conductive tracks, the lands, the openings, and the varnish layer), the external contour of the circuit, the drillings, the marking of the circuit, etc. Examples of format are the Gerber, ODB++, DXF (Drawing eXchange Format), and DPF (Dynamic Process Format) formats. The Gerber format is a two-dimensional images vectorial image description format describing a full image of one or more layer(s) of the printed circuit. Two Gerber formats are widespread in the printed circuit industry: the RS-274D format and the RS-274X format (also called extended Gerber or X-Gerber format).

The digital description files may be used to control printed circuit manufacturing machines. A machine dedicated to performing a specific step during the printed circuit manufacturing may be controlled based on a digital description file containing only the printed circuit description elements necessary to carry out the considered step.

As an example, the welding paste blocks may be formed by silk-screening by using a silk-screening mask. This mask may be formed from a digital description file which only describes the positions and the dimensions of the deposits.

According to an embodiment, a file of digital description of the electronic circuit is used as a reference model to correct the deformations of images $I3D_E$ and $I3D_F$. According to an embodiment, the file of digital description of the silk-screening mask to form the welding paste blocks is used as a reference model.

Figure 7:
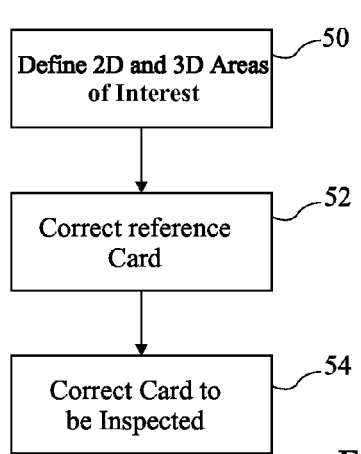
FIG. 7 shows in the form of a block diagram an embodiment of a deformation correction method.

FIG. 7 shows, in the form of a block diagram, an embodiment of a method of correcting three-dimensional images of electronic circuits. The method comprises successive steps 50, 52, and 54. Steps 50 and 52 are steps which may be implemented only once for each electronic circuit having a new circuit pattern. Step 54 is a step performed repeatedly for each electronic circuit to be inspected.

At step 50, processing system 16 completes the reference model with descriptions of areas of interest which are used subsequently to correct the three-dimensional images of the empty card and of the full cards. An area of interest is an area of the empty or full card which may easily be identified on a two-dimensional image of the card acquired by camera C and/or on the three-dimensional image of the card determined by processing system 16 and which may be used to estimate the 2D or 3D deformations of the electronic circuits.

Among such areas of interest, areas of interest adapted for the determination of 2D deformations, called 2D areas of interest hereafter, can be distinguished from areas of interest adapted for the determination of 3D deformations, called 3D areas of interest hereafter. 2D areas of interest are areas which can easily be identified on the top view of the empty and full cards, that is, on the two-dimensional images acquired by camera C. An example of 2D area of interest is an area of the printed circuit where a conductive track changes direction, generally according to a 45° or 90° angle. Another example of 2D area of interest corresponds to an opening crossing the printed circuit. 3D areas of interest are areas which can be easily identified on the three-dimensional images of the empty and full cards. According to an embodiment, a 3D area of interest is an area of the printed circuit which has a substantially stable height, that is, for which this entire area keeps a substantially constant height even when the circuit is deformed. An example of 3D area of interest is an area of the printed circuit at the level of which resin layer 32 is present and covers no narrow conductive tracks 24, particularly, an area of the printed circuit at the level of which resin layer 32 covers no conductive track or covers the ground plane. According to another embodiment, a 3D area of interest is an area of the printed circuit having a significant texture variation. An example of 3D area of interest then is an edge of a conductive track 24 or an opening 28 crossing the printed circuit.

The 2D or 3D areas of interest should be visible on the two-dimensional or three-dimensional images of the empty card and of the full card. Thereby, lands cannot be used as 2D or 3D areas of interest. Indeed, while the lands are visible on the empty cards, they are generally at least partly covered with the welding paste blocks on the full cards. More generally, the elements with positions on two cards having a common model which cannot not be identical cannot be used as 2D or 3D areas of interest. For example, inscriptions used, particularly, to identify components, and bar-codes cannot be used as 2D or 3D areas of interest.

At step 52, reference empty card Card$_E$ is arranged in optical inspection system 10 and three-dimensional image I3D$_E$ of the empty card is determined. A step of correcting the deformations of image I3D$_E$ is carried out. This is obtained by applying a transformation to image I3D$_E$ to deliver a corrected three-dimensional image I3D$_{EC}$ of the empty card.

At step 54, full cards Card$_F$ to be inspected are arranged one after the other in optical inspection system 10. Each full card Card$_F$ comprises deformations which may vary from one full card to the other, and with respect to empty card Card$_E$. A three-dimensional image I3D$_F$ is determined for each full card. A step of correcting the deformations of image I3D$_F$ is carried out. This is obtained by applying a transformation to image I3D$_F$ to deliver a corrected three-dimensional image I3D$_{FC}$ of the full card. Corrected image I3D$_{FC}$ is then compared with reference image I3D$_{EC}$, for example, to determine geometric parameters of the welding paste blocks, as described previously.

Figure 8:
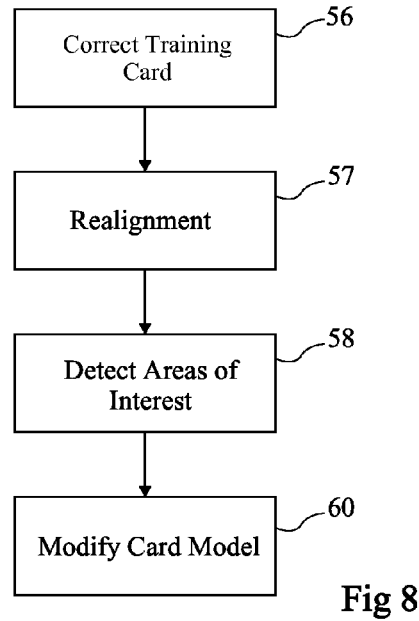
FIG. 8 illustrates, in the form of a block diagram, a more detailed example of a step of the embodiment illustrated in FIG. 7.

FIG. 8 shows, in the form of a block diagram, a more detailed embodiment of step 50 where step 50 comprises successive steps 56, 57, 58, and 60.

According to an embodiment, the available digital description files do not comprise the descriptions of conductive tracks 24, of openings 20 crossing support 20, or of openings 34 in resin layer 32, and the single available digital description file for example corresponds to the digital file of description of the silk-screening mask used to deposit welding paste blocks 36.

Figure 9:
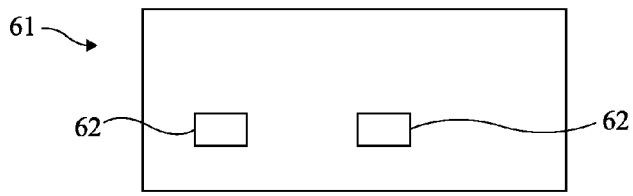
FIG. 9 shows an example of a model of a printed circuit corresponding to the printed circuit example of FIGS. 2A and 2B.

FIG. 9 shows an equivalent image 61 of a digital description file which only describes the positions and the dimensions of openings 62 necessary to form the silk-screening mask. Image 61 shown in FIG. 9 is that of the silk-screening mask used to form welding paste blocks 36 of the printed circuit shown in FIGS. 3A and 3B.

At step 56, a three-dimensional image of a training card is determined. The training card may correspond to an empty or full card. The three-dimensional image is corrected to suppress 2D and 3D deformations. As an example, a computer processing of the image may be implemented to compensate for the 2D and 3D deformations. As an example, the corrective processing may comprise the filtering of the low spatial frequencies of the three-dimensional image of the training card corresponding to most of the 2D and 3D deformations of the training card. In particular, for each point of coordinates (x, y, z) of the surface of the training card, a filtering of low frequencies may be applied to coordinate z. This processing cannot be implemented on inspection of each printed circuit at step 54. Indeed, the processing requires a large amount of data to be processed, and thus means which are too expensive, and has a duration which is not compatible with a processing at an industrial rate. Further, this processing may be less accurate than the correction performed at step 52 or 54.

A two-dimensional image, called texture image hereafter, corresponding to a top view of the training card, is further used. This view may correspond to an image acquired by camera C or to a combination of a plurality of two-dimensional images acquired by camera C or by a plurality of cameras. It may be a color or grey level image, preferably color. The texture image corresponds to a pixel array, each pixel being defined by a digital value corresponding to a grey level or to a color code. The texture image may be corrected based on the three-dimensional image of the corrected training card.

Processing system 16 delimits on the corrected texture image the areas which correspond to conductive tracks 24 covered with resin layer 32, the electronic components, if present, welding paste blocks 36, openings 28 crossing support 20, lands 26. This determination may be carried out based on the color or on the grey level of each pixel, for example, by a contour search or by a statistic classification of the pixels. Processing system 16 determines a new two-dimensional image, called label image hereafter, based on the texture image. The image of labels corresponds to a pixel array where each pixel of the texture image has an associated code representative of the type of area to which the pixel belongs. As an example, a first code corresponds to a conductive track 24 covered with resin, a second code corresponds to a welding paste block 36, a third code corresponds to an area of resin layer 32 covering no conductive track, a fourth code corresponds to a through opening 28, etc. The label image may be determined based on the corrected texture image and, in this case, a corrected label image is directly obtained. As a variation, the label image may be determined based on the non-corrected texture image and then be corrected, especially based on the three-dimensional image of the corrected training card.

At step 57, a geometric function F$_0$ which matches, with each pixel of coordinates (u, v) of the image described by the digital description file, a pixel of coordinates (x, y) of the deformed three-dimensional, texture, and label images, is determined. When the training card corresponds to a full card, function F$_0$ may be determined based on a number of matching points between the theoretical positions of welding paste blocks 62 described in the digital description file and the welding paste 36 identified in the label image. For example, this matching may be performed by a method of matching two-dimensional point clouds between the theoretical positions of welding paste blocks 62 and paste blocks 36. Between these matching points, function F$_0$ is determined by interpolation.

Function F$_0$ enables to correct the three-dimensional, texture, and label image of the full card so that the 2D and 3D areas of interest which are, according to certain embodiments described hereafter, detected in these different images, will be expressed and positioned in the reference frame of the digital description file.

In another embodiment, the determination of the label image may be performed based on the three-dimensional image and on the texture image of the empty card. An example of a method of determining the label image may implement the method described in still unpublished French patent application FR12/57518. The determination of function F$_0$ for matching the digital description file with the empty card is performed based on the matching of the lands described in the digital description file with those detected in the three-dimensional and texture images of the empty card. As previously described, between these matching points, function F$_0$ may be determined by interpolation. In this specific embodiment, the training card used in step 56 may be the empty reference card.

At step 58, processing system 16 searches for the 2D and 3D areas of interest on the label image, on the texture image, and/or on the three-dimensional image of the training card. This search may be performed automatically, semi-automatically, or manually. Preferably, all the 2D or 3D areas of interest of the entire label image are detected. The search for the 2D areas of interest may be directly performed from the label image, from the texture image, and/or from the three-dimensional image of the training card by searching for openings 28 crossing the support or by searching for the changes of direction of conductive tracks 24. The search for the 3D areas of interest may be performed by using the label image and the corrected three-dimensional image. As an example, processing system 16 determines the regions of the label image where resin layer 32 covers no conductive track 24 or the regions of the label image where resin layer 32 covers a ground plane. Among the regions thus determined, the 3D areas of interest are those which have a substantially constant height on the corrected three-dimensional image.

Figures 10, 11:
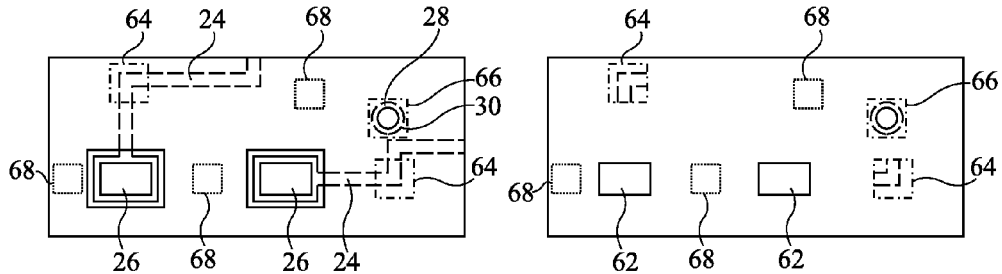
FIG. 10 shows a top view of a printed circuit having areas of interest delimited thereon.
FIG. 11 shows an example of modified printed circuit model obtained from the printed circuit example of FIG. 10.

FIG. 10 shows the 2D and 3D areas of interest for the example of the printed circuit of FIG. 2A. As an example, three 2D areas of interest are shown: two 2D areas of interest 64 corresponding to a right-angled portion of a conductive track 24 and a 2D area of interest 66 corresponding to a through opening 28. Further, three 3D areas of interest 68 are shown and correspond to portions of the printed circuit at a substantially constant height, at the level of which there are no metal tracks or openings.

Processing system 16 then modifies at step 60 the digital description file to add thereto a description of each 2D or 3D area of interest.

FIG. 11 shows the model illustrated in FIG. 9 at the level of which areas of interest 64, 66, and 68 shown in FIG. 10 have been added.

The description of a 3D area of interest in the digital description file may comprise the position of the border delimiting the 3D area of interest. As an example, in the case of a square- or rectangle-shaped border, this may concern two-dimensional positions of the two diagonally opposite corners of the square or of the rectangle. As an example, the border of a 3D area of interest may delimit a square having 1-mm side length. The description of the 3D area of interest may further comprise the standard deviation of the height of the three-dimensional image on this area, the average height of the 3D area of interest on the three-dimensional image, the equation of the median plane crossing the points of the 3D area of interest, or a statistic descriptor of the texture.

The description of a 2D area of interest in the digital description file may comprise the position of the border delimiting the 2D area of interest. As an example, in the case of a square- or rectangle-shaped border, it may be two-dimensional positions of the two diagonally opposite corners of the square or of the rectangle. As an example, the border of a 2D area of interest may delimit a square having 5-mm side length. The description of the 2D area of interest may further comprise geometric parameters which are characteristic of the shape to be recognized in the 2D area of interest. These are for example a contour line, or a texture pattern. The description of the 2D area of interest may also be in the form of a descriptor of SIFT type (Scale Invariant Feature Transform) described, in particular, in U.S. Pat. No. 6,711,293, or of SURF type (Speeded Up Robust Features) or any other descriptor used to for the readjustment of shapes and textures.

According to another embodiment, the available digital description files comprise a description of conductive tracks 24 and a description of through openings 28. In this case, the search for the 2D and 3D areas of interest may be directly performed from the digital description files. The previously described steps of determining a label image and the estimating of transformation $F_0$ may then be omitted. As an example, the 2D areas of interest are determined from the file of digital description of conductive tracks 24 and from the file of digital description of through openings 28, and the 3D areas of interest are searched for by determining, from the different digital description files, the regions of the printed circuit covered with resin layer 32 and where there are no metal tracks, lands, through openings, inscriptions, etc.

Processing system 16 then modifies one of the digital description files, for example, the digital description file of the silk screening mask, to add thereto a description of each 2D and 3D area of interest.

Figure 12:
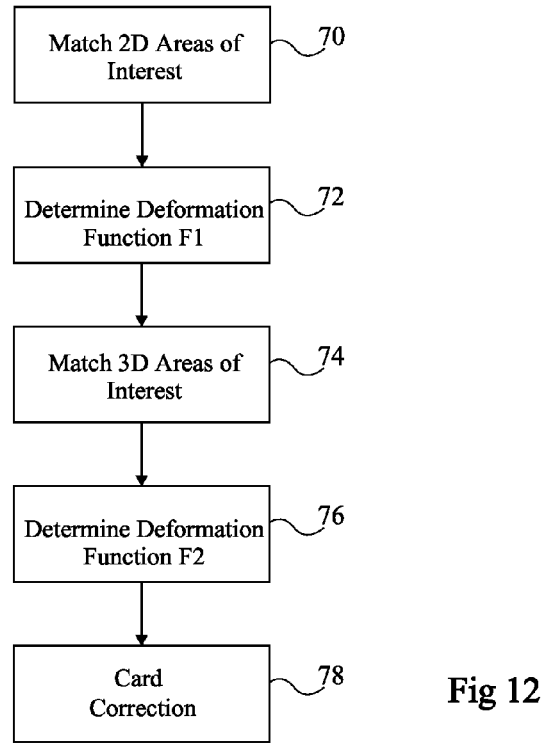
FIG. 12 illustrates, in the form of a block diagram, a more detailed example of another step of the embodiment illustrated in FIG. 7.

FIG. 12 shows, in the form of a block diagram, a more detailed embodiment of step 52 or 54 of the method illustrated in FIG. 7. Step 52 or 54 may be implemented by the following successive steps 70, 72, 74, 76, and 78.

At step 52 or 54, the three-dimensional image of a portion only of the empty/full card may be determined. In this case, the method comprises a step of selecting the 2D and 3D areas of interest which are to be searched for from all the 2D and 3D areas of interest determined at step 50. This selection may be performed automatically, semi-automatically, or manually.

At step 70, the selected 2D areas of interest are searched for in the deformed texture image of the empty/full card. As an example in the case where the model comprises marks, processing system 16 may correct the general position of the deformed texture image so that the marks of the deformed texture image are generally superposed to the marks of the model. Each 2D area of interest can then be searched from a search region around the expected position of the 2D area of interest in the model by displacing a sliding window in the texture image search region, this sliding window for example having the dimensions of the border of the 2D area of interest and containing the pattern of the desired 2D area of interest. The 2D area of interest is the portion of the texture image for which the pattern coincides most with the texture image. The search for the 2D areas of interest may further be performed according to the method described in patent application US2012/0128231.

Figures 13A, 13B:
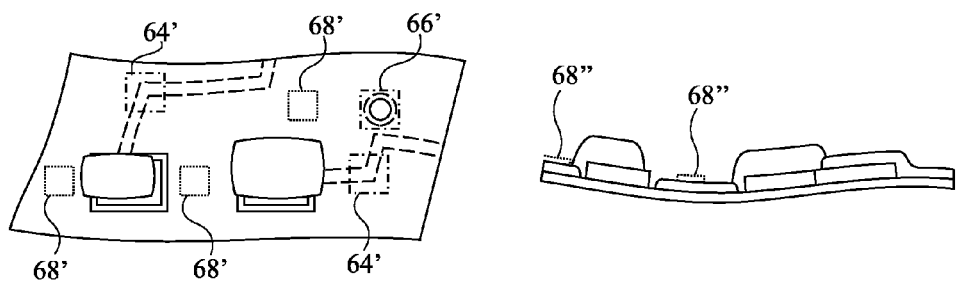
FIGS. 13A and 13B respectively show a top view and a cross-section view of a deformed electronic circuit having areas of interest delimited thereon.

FIG. 13A shows the view of FIG. 6A on which 2D areas of interest 64' and 66' respectively corresponding to 2D areas of interest 64 and 66 have been determined.

At step 72, when the selected 2D areas of interest have been found, processing system 16 determines a geometric function F1 which matches, with each pixel of coordinates (u, v) of the image described by the digital description file, a pixel of coordinates (x, y) of the deformed texture image. Function $F_1$ is for example determined as follows:
  for the selected 2D areas of interest, function $F_1$ enables to pass from each 2D area of interest selected on the digital description file to the corresponding 2D area of interest on the deformed texture image and three-dimensional image;
  outside of the 2D areas of interest, function $F_1$ is determined by interpolation, for example, by linear interpolation, by polynomial interpolation, or by the spline method.

At step 74, the selected 3D areas of interest are searched form the deformed three-dimensional image of the empty/full card. To achieve this, geometric transformation function $F_1$ is applied to the 3D areas of interest of the image described by the digital description file at coordinates (u, v). This enables to obtain deformed 3D areas of interest on the deformed texture image of the full/empty card at coordinates (x, y). FIG. 13A shows 3D areas of interest 68' thus obtained corresponding to the 3D areas of interest 68 of the model of FIG. 11 to which function $F_1$ has been applied.

According to an embodiment, the 3D areas of interest, may then be located on the three-dimensional image of the empty/full card at the positions corresponding to the 3D areas of interest 68' determined on the texture image.

According to another embodiment where images of a same portion of the empty/full card are acquired by a plurality of cameras, the position of at least one of the 3D areas of interest on the three-dimensional image of the empty/full card may be determined by triangulation from the positions of the 3D area of interest acquired by the cameras.

FIG. 13B shows the view of FIG. 6B on which 3D areas of interest 68" corresponding to areas of interest 68' shown in FIG. 13A.

At step 76, where the selected 3D areas of interest have been found on the three-dimensional image, processing system 16 determines a geometric transformation function $F_2$ which matches each point of coordinates (x, y) of the deformed texture image with a point of coordinates (x, y, z) of the three-dimensional image.

Function $F_2$ is for example determined as follows:
for the selected 3D areas of interest, function $F_2$ enables to pass from each 3D area of interest determined on the deformed texture image to the corresponding 3D area of interest on the three-dimensional image;
outside of the 3D areas of interest, function $F_2$ is determined by interpolation, for example, by linear interpolation, by polynomial interpolation, or by the spline method.

Function $F_2$ thus transforms into a curved surface the planar surface which corresponds to the upper surface of the resin layer of the non-deformed three-dimensional image, thus representing the warping of the full/empty card.

At step 78, processing system 16 applies the inverse of function $F_2$ to coordinates (x, y) of each point of the three-dimensional image of the deformed full/empty card. The obtained value is subtracted from coordinate z, corresponding to a coordinate w. The inverse of function $F_1$ is applied to coordinates x and y, corresponding to coordinates (u, v). A corrected three-dimensional image is then obtained. Each point of coordinates (x, y, z) of the deformed three-dimensional image has a corresponding point of coordinates (u, v, w) of the corrected three-dimensional image given by the following relations:

$$(u,v)=F_1^{-1}(x,y)$$

$$w=z-F_2^{-1}(x,y)$$

The steps of determining functions $F_1$ and $F_2$ at steps 52 and 54 may advantageously be implemented at an industrial scale, and particularly at an industrial rate.

According to another embodiment, a single geometric transformation may be directly determined, which matches each point of coordinates (x, y, z) of the three-dimensional image with a point of coordinates (u, v, w) of the corrected three-dimensional image.

Specific embodiments have been described. Various alterations and modifications will occur to those skilled in the art. In particular, although previously-described system 10 is capable of implementing a method of determining a three-dimensional image of an object by projection of images on the object, it should be clear that the three-dimensional image determination method may be different, for example, by implementing interferometric methods. Further, although an optical inspection system has been described for the inspection of electronic circuits, it should be clear that the optical inspection system may be used for the optical inspection of other objects.

The invention claimed is:

1. In an optical inspection system comprising an image processing computer system connected to an image sensor, a method of determining condition of a deformed object comprising:
    providing a reference model of the deformed object comprising first areas;
    determining in the initial three-dimensional image second areas corresponding to the first areas;
    determining a first geometric transformation which matches the second areas with the first areas;
    determining a corrected three-dimensional image based on the first geometric transformation and on the initial three-dimensional image;
    providing the reference model of the deformed object comprising third areas;
    acquiring at least one two-dimensional image of the object with the image sensor;
    searching in the two-dimensional image for at least fourth areas corresponding to the third areas;
    determining a second geometric transformation which matches the fourth areas with the third areas;
    applying the second transformation to the first areas to obtain fifth areas the two-dimensional image;
    searching in the initial three-dimensional image for the second areas corresponding to the fifth areas;
    determining a third geometric transformation which matches the second areas with the fifth areas;
    determining the corrected three-dimensional image based on the second and third geometric transformations and on the initial three-dimensional image; and
    determining condition of the deformed object based on the corrected three-dimensional image.

2. The method of claim 1, wherein the object comprises a printed circuit comprising at least a support, conductive tracks on the support, and a resin layer at least partly covering the conductive tracks.

3. The method of claim 2, wherein at least one of the first areas comprises a planar portion of the resin layer.

4. The method of claim 2, wherein at least one of the first areas comprises the edge of a conductive track.

5. The method of claim 2, wherein at least one of the third area comprises a pattern of an opening crossing the printed circuit.

6. The method of claim 2, wherein at least one of the third areas comprises a pattern of a conductive track changing direction.

7. The method of claim 1, comprising a step of providing an initial model which does not comprise the first and third areas and a step of modifying the initial model to add thereto a description of the first and third areas.

8. The method of claim 7, comprising the steps of, in a training phase:
    acquiring a three-dimensional image of a training object;
    correcting the deformations of the three-dimensional image of the training object;
    determining first and third areas on the corrected three-dimensional image of the training object; and
    modifying the initial model to add thereto a description of the determined first and third areas.

9. The method of claim 8, wherein the reference model is representative of a two-dimensional image.

10. The method of claim 8, further comprising determining a fourth geometric transformation which matches the points of the three-dimensional image of the training object with the pixels of the initial model.

11. The method of claim 1, comprising the steps of:
  determining a first three-dimensional image of an empty printed circuit;
  determining the first geometric transformation associated with the first three-dimensional image;
  correcting the first three-dimensional image from the first geometric transformation associated with the first three-dimensional image;
  determining a second three-dimensional image of a printed circuit covered with welding paste blocks;
  determining the first geometric transformation associated with the second three-dimensional image;
  correcting the second three-dimensional image based on the first geometric transformation associated with the second three-dimensional image; and
  comparing the first and second corrected three-dimensional images.

12. The method of claim 11, comprising a step of selecting first areas from among said first areas for the determination of the first geometric transformation associated with the second three-dimensional image.

13. The method of claim 1, comprising a step of selecting third areas from among said third areas for the determination of the first geometric transformation associated with the second three-dimensional image.

* * * * *